J. ZINS.
MACHINE FOR THE MANUFACTURE OF HORSESHOES.
APPLICATION FILED SEPT. 27, 1909.

1,136,990.

Patented Apr. 27, 1915.
2 SHEETS—SHEET 1.

Witnesses
Albert Kirchhoff
Wilhelm Strupp

Inventor
Johann Zins

J. ZINS.
MACHINE FOR THE MANUFACTURE OF HORSESHOES.
APPLICATION FILED SEPT. 27, 1909.

1,136,990.

Patented Apr. 27, 1915.
2 SHEETS—SHEET 2.

Witnesses:
Albert Kirchhoff
Wilhelm [illegible]

Inventor:
Johann Zins

UNITED STATES PATENT OFFICE.

JOHANN ZINS, OF BREMEN, GERMANY, ASSIGNOR TO THE FIRM OF WIESCHE & SCHARFFE, OF FRANKFORT-ON-THE-MAIN, GERMANY.

MACHINE FOR THE MANUFACTURE OF HORSESHOES.

1,136,990.  Specification of Letters Patent.  Patented Apr. 27, 1915.

Application filed September 27, 1909. Serial No. 629,518.

*To all whom it may concern:*

Be it known that I, JOHANN ZINS, a subject of the German Emperor, and resident of Bremen, Germany, have invented a Machine for the Manufacture of Horseshoes, of which the following is a description.

This invention relates to machines employed in the manufacture of horse shoes, and consists in certain improvements designed to facilitate and expedite their manufacture.

According to the present invention, the operations of shaping and punching the horse shoe are effected during the forward movement of a reciprocating table; a length of bar, which is to be formed into a horse shoe, being passed, first between rollers, where it is bent around a "former," then beneath a matrix, where it is pressed into the desired shape, and ultimately beneath a punch which punches the holes for the nails.

The accompanying drawings illustrate a machine embodying my improvements.

Figure 1:
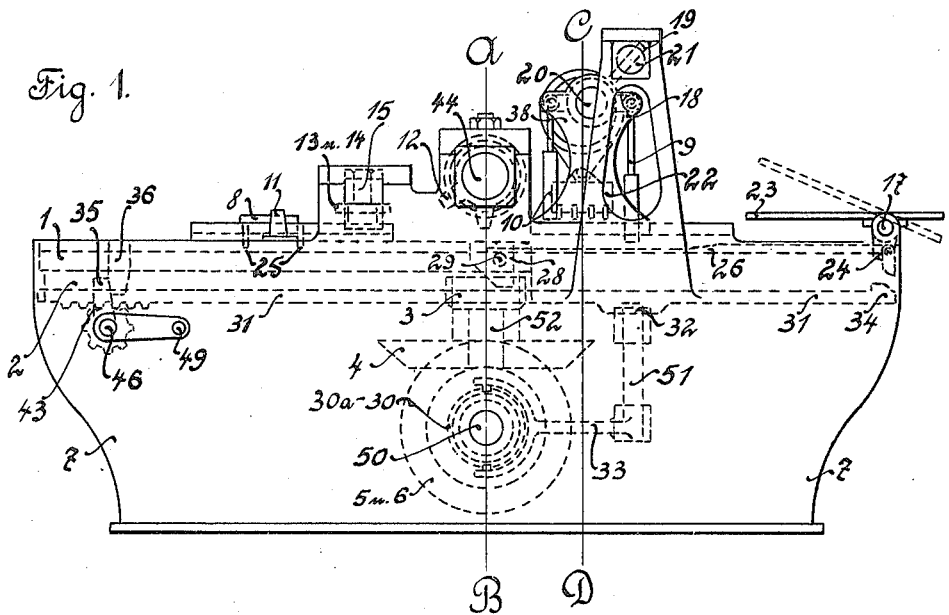
Figure 2:
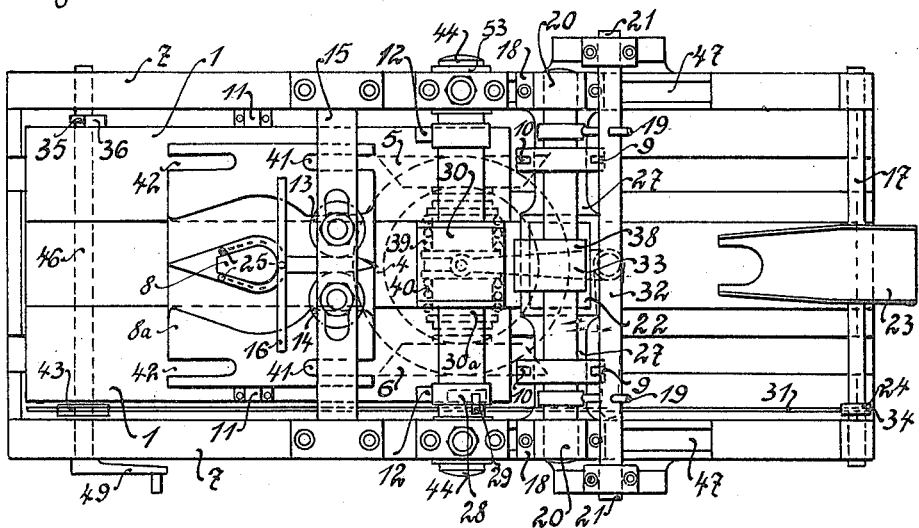
Figure 3:
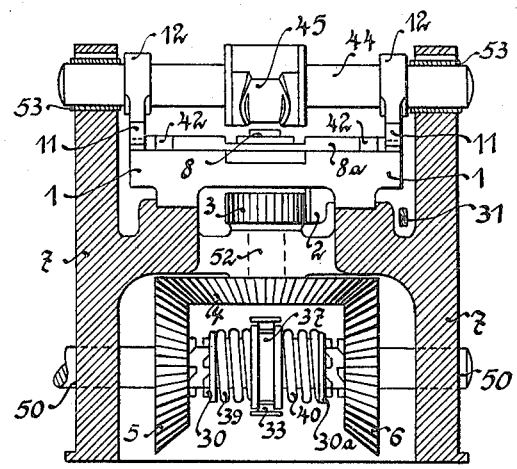
Figure 4:
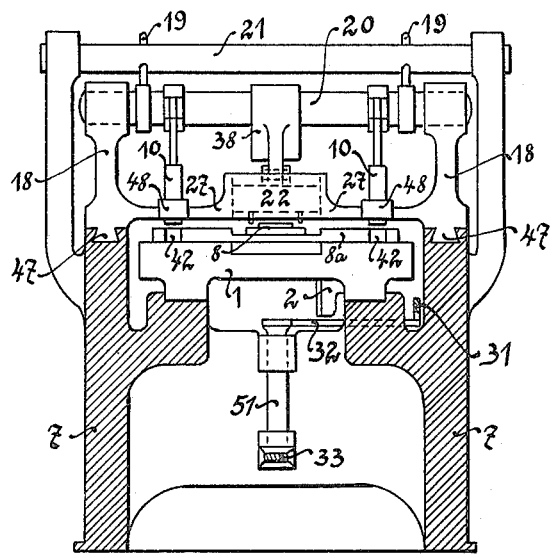

Figure 1 is a side elevtion and Fig. 2 a plan of the machine. Fig. 3 is a section on the line A—B in Fig. 1; and Fig. 4 a section on the line C—D also in Fig. 1.

In carrying my invention into effect, I provide a frame (7) for supporting a table (1) which is mounted to reciprocate therein. This table is furnished with a removable block or "former" (8) shaped to correspond with the internal periphery of the horse shoe which is to be made, and above the table are two rollers (13—14) adjustably mounted upon and supported from a transverse support (15) carried by the frame (7). These rollers are so disposed relatively to the block (8) that, upon the latter reaching the former during the advance of the table (1) they engage with a length of bar (16) from which the shoe is to be formed and bend same around the "former" (8). The bent rod (16) is now conveyed by the table (1) to a matrix (45), which is eccentrically mounted upon a shaft (44) carried in bearings (53) formed or provided upon the frame (7) of the machine. The shaft (44) is furnished toward each end with forked levers (12) which extend into the path of two upwardly projecting fingers (11) respectively mounted on opposite sides of the block (8). These fingers are so arranged relatively to the block (8) that while the table (1) is passing beneath the matrix (45) said fingers engage with the levers (12), vibrate the shaft (44), force the matrix down upon the bar (16) and complete the formation of the shoe. The matrix (45) is preferably so shaped as to form the rear portion of the shoe thicker than the front portion, while the upper or bearing surface is made greater than the lower surface and a beveled outer periphery formed. The grooves for the reception of the heads of the nails are also formed by the matrix; but the holes for the nails are subsequently provided by a punching mechanism to which the shoe is conveyed by the table (1). The punching mechanism comprises a punch (22), eccentrically mounted on a shaft (20), which is carried in bearings formed in a frame (18—27) mounted to slide in guides (47) formed in the frame (7) of the machine. Toward opposite ends of the shaft (20) are provided pairs of arms (9—10) respectively; the arms (9—9) of the one pair being on the one side of the shaft (20) and the arms (10—10) of the other pair being suspended on the other side of the shaft (20). The depending arms pass through lugs (48) formed in the frame (18—27). The shaft (20) is also provided with two arms (19—19) which pass through openings formed in a shaft (21) mounted in bearings in the frame (7) of the machine and at a higher level than, but parallel to the shaft (20). Normally, the suspended arms (9—9) on the one side of the shaft (20) are depressed and project into the path of the base plate (8ª) of the block (8), so that during the advance of the table (1) said arms become engaged by recesses (41—41) formed in the base plate (8ª). Upon this engagement taking place the advancing table will force the arms (9—9) together with the frame (18—27) forward from the one side to the other side of the upper shaft (21), with the effect that the shaft (20) mounted in said frame will be rotated by reason of the arms (19—19) which engage in the shaft (21); this shaft being stationary in the frame (7) of the machine. The frame (18—27) advances with the table (1) until the shaft (20) has rotated through such an angle as to raise the arms (9—9) on the one side thereof out of engagement with the one side of the base plate (8ª), and to lower the arms (10—10) on the other side thereof to a corresponding amount. Simultaneously with the raising of the arms (9—9) and the lowering of the arms (10—10), the punch (22) will be first forced down upon the horse shoe (16) and then raised therefrom, thus completing the manufacture of the shoe. The completed shoe is now brought by the table (1) to a chute (23), which is pivotally mounted upon the forward end of the frame (7) of the machine, and which is disposed in such a manner as to engage between the shoe (16) and the base plate (8ª). In the block (8) are pins (25) which are arranged beneath the shoe (16) and which project through the table (1) so as to engage with an inclined plane (26) mounted below the chute (23). This inclined plane raises the pins (25), which in turn lift the finished horse shoe (16) to admit of the latter being received by the chute (23). Upon the table (1) reaching the end of its forward stroke a stop (28) thereon engages a projection (34) at the end of a lever (31) which operates driving mechanism, as hereinafter described, and reverses the motion of the table (1). The stop (28) also serves to tilt the chute (23) to discharge the finished shoe (16); same being accomplished by a pin (29) on said stop vibrating a latch (24) with which the chute (23) is furnished.

The means for driving the table (1) comprise a horizontal main shaft (50) whereon are mounted to rotate freely two bevel wheels (5—6) which are adapted to be engaged by clutches (30—30ª) with springs (39—40), respectively. These clutches are connected to a lever (33) secured to the one end of a shaft (51) which, at its opposite end, is furnished with an arm (32) connected to the lever (31) which is moved by the table (1) when nearing the end of its forward and backward strokes. The bevel wheels (5—6) mesh with a bevel wheel (4) mounted at the one end of a vertical counter-shaft (52), the opposite end of which is furnished with a pinion (3) which is in mesh with a rack (2) beneath the table (1). The forward movement of the table is effected by rotating the pinion (3) in one direction by engaging the clutch (30) with the bevel wheel (5) thus locking this wheel to the main shaft (50). Toward the end of the forward stroke of the table (1) the stop (28) thereon engages with the lever (31) and moves it forward, with the effect that the shaft (51) is rotated, whereupon the clutch lever (33) is caused to disengage the clutch (30) from the bevel wheel (5), and to engage the clutch (30ª) with the bevel wheel (6). The pinion (3) will now rotate in the direction to return the table (1). During the return of the table, the arms (10) pertaining to the punching mechanism are engaged by the base plate (8ª) of the "former" (8) and the punching mechanism moved in the opposite direction to that previously described, with the effect that the arms (10) are raised and the arms (9) depressed into position for operating the punching mechanism at the next stroke of the table (1). The matrix (45) is also set into position during the return of the table (1), same being effected by the fingers (11) on said table engaging with the forked levers (12) and rotating the matrix shaft (44). Upon the table (1) reaching the end of its return stroke, it may be started forward again automatically by means of a stop (36) at the rear end of the table engaging a stop (35) at the end of a shaft (46) pertaining to the striking mechanism; thus reversing the direction of running of the driving mechanism.

For starting and stopping the machine, I may provide the lever (31) of the striking mechanism with a rack which meshes with a pinion (43) mounted upon the shaft (46), furnished with a handle (49).

Having now particularly described and ascertained the nature of my said invention and in what manner the same is to be performed, I claim:—

1. The herein described machine for the manufacture of horse-shoes, comprising a table, a shoe-"former" on said table, a pair of bending rollers, a matrix, and a punch; means for reciprocating said table beneath said rollers, matrix, and punch, and means for operating the matrix and then the punch during the forward movement of said table, said means serving during the return of the table to set the punch and the matrix into operative position.

2. In a machine for the manufacture of horse-shoes, the combination with a reciprocating table and a "former" on said table, of a matrix mounted above said table, levers for vibrating said matrix, and means on said table for actuating said levers as said table moves to and fro, substantially as set forth.

3. In a machine for the manufacture of horse-shoes, the combination, with a reciprocating table and a "former" on said table, of a punch mounted above said table, levers mounted at the front and rear of said punch, and means on said table for actuating said levers; the levers at the front of the punch being actuated during the forward movement of the table to perforate the shoe, while the levers at the rear of the punch are actuated during the return of the table to set the punch in its normal position, substantially as set forth.

4. In a machine for the manufacture of horse-shoes, the combination, with a reciprocating table whereon the shoe is formed, of a chute pivotally mounted at the front end of the machine and so disposed as to receive the shoe from its "former"; a latch mounted on the pivot of said chute and a catch on said table adapted to engage with said latch and to tip the chute, substantially as set forth.

In testimony whereof I affix my signature in the presence of two witnesses.

JOHANN ZINS.

Witnesses:
ALBERT KIRCHHOFF.
FRIEDRICH SCHMIDT.

Copies of this patent may be obtained for five cents each, by addressing the "Commissioner of Patents, Washington, D. C."